Feb. 5, 1929.

H. D. STERICK 1,701,315

COMBINATION CAMERA AND PURSE

Filed Nov. 11, 1927    2 Sheets-Sheet 1

WITNESSES
A B Wallace

INVENTOR
Harrison D. Sterick
by William B. Jaspert.
his Attorney.

Feb. 5, 1929.
H. D. STERICK
1,701,315
COMBINATION CAMERA AND PURSE
Filed Nov. 11, 1927  2 Sheets-Sheet 2
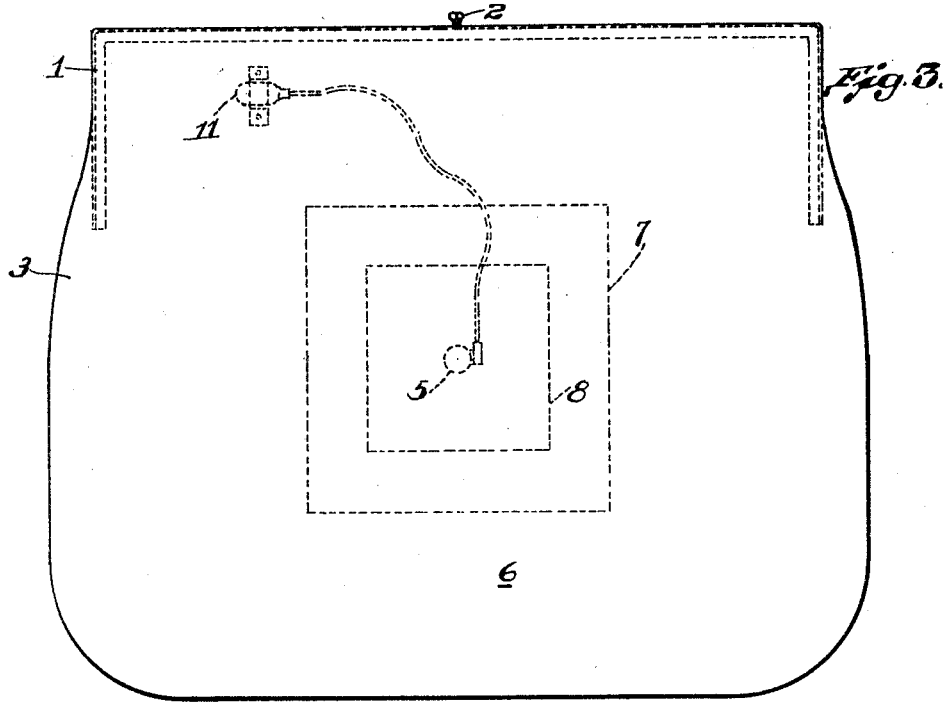
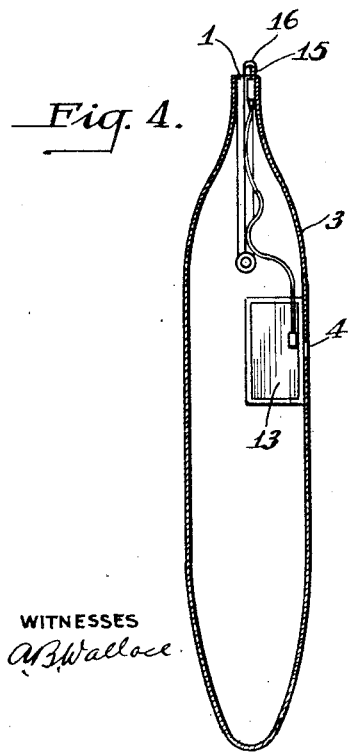
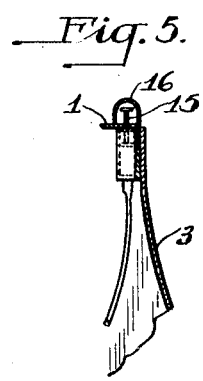
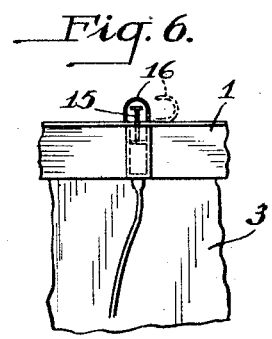
WITNESSES
A B Wallace
INVENTOR
Harrison D. Sterick
by William B Jaspert
his attorney.

Patented Feb. 5, 1929.

1,701,315

UNITED STATES PATENT OFFICE.

HARRISON D. STERICK, OF PITTSBURGH, PENNSYLVANIA.

COMBINATION CAMERA AND PURSE.

Application filed November 11, 1927. Serial No. 232,534.

This invention relates to a combined purse and camera case, more particularly to a mounting for a camera in a purse or vanity case, in a manner to extend the camera in its focused position when the purse is open to render it available for use.

It is among the objects of this invention to provide a combined purse and camera case which shall be adapted for the convenient and permanent disposition of a camera and which shall be adapted for operation in a simple and convenient manner without removing the camera from its mounting.

Another object of the invention is to provide a combined purse and camera of the above designed character which shall be of simple construction and which shall be adapted for use as a camera by opening the purse in which it is contained to its normally open position.

Another object of the invention is the provision of apparatus as set forth above by means of which photographic impressions may be obtained in an inconspicuous manner without exposing the camera element.

Figure 1:
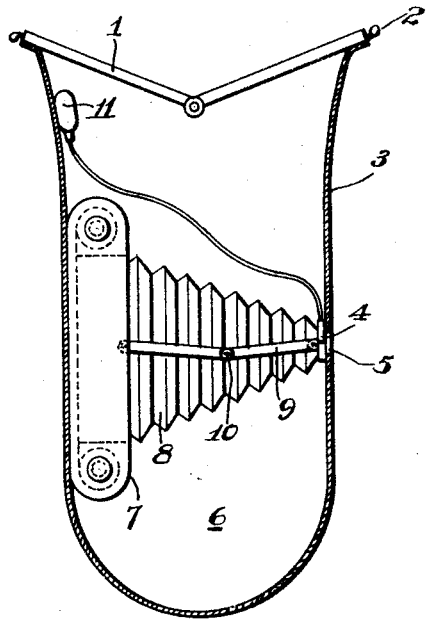
Figure 2:
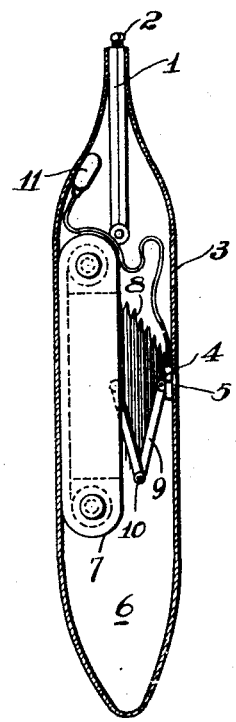

In the accompanying drawings constituting a part of this invention and in which like reference characters designate like parts, Fig. 1 is a sectional elevational view of a combined purse and camera embodying the principles of this invention, illustrating the purse and camera in their open or extended position; Fig. 2 a similar view illustrating the apparatus of Fig. 1 in its closed position; Fig. 3 is a side elevational view of the apparatus shown in Figs. 1 and 2; Fig. 4 a sectional elevational view of a combined purse and camera illustrating a modification of the apparatus shown in Figs. 1 and 3 inclusive; Fig. 5 is a sectional elevation of the lens shutter operating mechanism embodied in the camera element illustrated in Fig. 4; Fig. 6 is a side elevational view of the shutter operating mechanism.

Referring to Figs. 1, 2 and 3 of the drawings, the structure therein illustrated comprises a purse embodying the usual hinged brackets 1 having clasps or locks 2 by which they may be held in their closed position and having a body portion 3 of cloth, leather or other suitable material joined to the brackets 1 in a well known manner.

The cover or bag portion 3 is provided with an opening 4 adapted to receive the lens 5 of a camera generally designated at 6, the case 7 of which is secured to the cover 3 at the side opposite the lens opening 4 and in operative alinement therewith.

The camera may be of standard construction and is preferably of the small type to make it available for use in moderately sized purses without taking up all the space therein so as to render the same useful as a receptacle or bag in the customary manner.

Referring to Figs. 1 and 2, the camera element 6 is illustrated as carrying the lens element 5 on an extensible bellows structure 8, this type of camera being in focus only when the lens 5 is in its extended position. To assure obtaining the proper focus of the lens, a pair of hinged arms 9 are provided which function so that when in their straight position, as illustrated in Fig. 1, the lens 5 is in proper spaced relation with the rear lens and film which is the position in which the camera is in focus. To permit closing the purse to the position shown in Fig. 2, spacing arms 9 which are hinged at their joint 10, may be depressed by the finger of the operator or by so constructing them that they cannot be brought up to the horizontal position as shown in Fig. 1, thus rendering them readily collapsible upon the pressure being brought to bear against the side of the purse.

The lens shutter is operated in the usual manner preferably by a bulb 11 which may be secured to the upper portion of the purse to be operated by a finger of the hand holding the brackets 1 that is nearest the bulb element.

Provision may be made to place a finder near the top of the purse but for all general purposes it is sufficiently practicable to locate the finder at the usual position adjacent the lens 5 or in the region of the casing 7.

In Fig. 3 the camera element is illustrated as being located substantially centrally of the purse but it is obvious that the same may be placed at one end to provide greater space for articles which may be carried in the bag.

In Figs. 4 to 6 of the drawings I have illustrated a modification of a combined purse and camera which consists of attaching a box camera 13 to the cover 3 of the bag, this type of camera being of the fixed focus type which may be secured to the side of the bag adjacent the lens opening 4. By utilizing a fixed focus camera in a purse the bag is not required to be opened to render the camera available for use and to render it operative in its closed position, I provide means for operating the shutter on the outside of the bag in the manner illustrated in Figs. 5 and 6.

As shown in Fig. 5, a plunger 15 of the type commonly employed for operating a shutter, is mounted on the brackets 1 and to prevent accidental manipulation thereof, I provide a hinged cover 16 which may be displaced in the manner shown in Fig. 6 to expose the plunger element for use. The camera 13 shown in Fig. 4 may be operated in either its open or closed position and may be utilized with or without a finder as desired.

It is evident that, from the foregoing description of my invention, a combination purse and camera constructed in the manner therein set forth, is a relatively inexpensive and simple combination which renders a camera available at all times without entailing the necessity of carrying a separate camera casing and it is further evident that a camera mounted in the manner described is extremely simple in its operation and may be employed in the taking of photographs with facility and dispatch, and without attracting attention.

Although I have described several embodiments of my invention, it will be obvious to those skilled in the art that various modifications may be made in the details of construction and in the arrangement of the several cooperating parts without departing from the principles as herein set forth.

I claim:

1. A combined purse and camera comprising a bag portion having hinged brackets for closing the same and a camera secured on one side of the bag having its lens secured to and projecting through the other side thereof, said camera being extensible to its focused position by the opening of the bag.

2. A combined purse and camera as set forth in claim 1 having a shutter actuating member located adjacent the bag opening.

3. A combined purse and camera as set forth in claim 1 provided with means for holding the lens in its projected position.

4. A combined purse and camera comprising a bag or cover portion attached to a pair of hinged brackets having a camera case secured on one side thereof and having a lens opening adjacent the case and a shutter actuating plunger so mounted as to be operative on the outside of the purse.

5. A combined purse and camera as set forth in claim 4 in which the shutter actuating member is secured to one of the hinged brackets.

6. A combined purse and camera as set forth in claim 4 in which the shutter operating plunger is provided with a guard to protect the same against accidental displacement.

In testimony whereof, I have hereunto set my hand.

HARRISON D. STERICK.